United States Patent
Wang et al.

(10) Patent No.: US 11,366,979 B2
(45) Date of Patent: Jun. 21, 2022

(54) USING SELECTED COMPONENTS OF FREQUENCY DOMAIN IMAGE DATA IN ARTIFICIAL INTELLIGENCE TASKS

(71) Applicant: Alibaba Group Holding Limited, Grand Cayman (KY)

(72) Inventors: Yuhao Wang, Hangzhou (CN); Minghai Qin, Hangzhou (CN); Yen-Kuang Chen, Hongzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 129 days.

(21) Appl. No.: 16/684,305

(22) Filed: Nov. 14, 2019

(65) Prior Publication Data

US 2021/0150260 A1 May 20, 2021

(51) Int. Cl.
   *G06K 9/62* (2022.01)
   *G06V 10/28* (2022.01)
   *G06V 10/42* (2022.01)
   *G06V 10/82* (2022.01)

(52) U.S. Cl.
   CPC ......... *G06K 9/6229* (2013.01); *G06K 9/6256* (2013.01); *G06K 9/6262* (2013.01)

(58) Field of Classification Search
   None
   See application file for complete search history.

(56) References Cited

U.S. PATENT DOCUMENTS

| | | | |
|---|---|---|---|
| 5,559,557 A | 9/1996 | Kato | |
| 5,629,736 A | 5/1997 | Haskell et al. | |
| 5,864,637 A | 1/1999 | Liu et al. | |
| 6,141,059 A | 10/2000 | Boyce et al. | |
| 7,209,594 B1 | 4/2007 | Martucci et al. | |
| 7,545,988 B2 | 6/2009 | Meeker | |
| 8,660,355 B2 | 2/2014 | Rodriguez et al. | |
| 11,037,336 B2 * | 6/2021 | Ye | G06T 7/0012 |
| 2004/0252758 A1 | 12/2004 | Katsavounidis et al. | |
| 2006/0013303 A1 | 1/2006 | Nguyen et al. | |
| 2008/0260276 A1 | 10/2008 | Yamatani et al. | |
| 2010/0014584 A1 | 1/2010 | Feder et al. | |
| 2012/0044990 A1 | 2/2012 | Bivolarsky et al. | |
| 2014/0010284 A1 | 1/2014 | Hong et al. | |
| 2014/0036997 A1 | 2/2014 | Lee | |

(Continued)

FOREIGN PATENT DOCUMENTS

| | | | | |
|---|---|---|---|---|
| CN | 109378054 A | * | 2/2019 | ........... G06N 3/0454 |
| CN | 111226230 A | * | 6/2020 | ............... G06N 3/04 |

(Continued)

OTHER PUBLICATIONS

Image and Video Compression Coding Theory, https://www.tcs.ifi.lmu.de/teaching/ws-2016-17/code/background-image-video-compression, 96 pages.

(Continued)

*Primary Examiner* — Mohammed Rachedine

(57) ABSTRACT

Image data is accessed. The image data includes frequency domain components. A subset of the frequency domain components is selected based on the relative importance of the frequency domain components. Only the subset of the frequency domain components is provided to an accelerator that executes a neural network to perform an artificial intelligence task using the subset of frequency domain components.

18 Claims, 7 Drawing Sheets

(56) References Cited

U.S. PATENT DOCUMENTS

| | | | |
|---|---|---|---|
| 2014/0362905 | A1 | 12/2014 | Nguyen et al. |
| 2016/0259960 | A1 | 9/2016 | Derakhshani et al. |
| 2016/0269733 | A1 | 9/2016 | Tourapis et al. |
| 2017/0132496 | A1 | 5/2017 | Shoaib et al. |
| 2017/0339430 | A1 | 11/2017 | Kalevo |
| 2018/0293713 | A1 | 10/2018 | Vogels et al. |
| 2018/0293777 | A1 | 10/2018 | Sarel et al. |
| 2019/0007685 | A1 | 1/2019 | Lievens et al. |
| 2019/0034716 | A1 | 1/2019 | Kamarol et al. |
| 2019/0244394 | A1 | 8/2019 | Gueguen et al. |
| 2019/0347847 | A1 | 11/2019 | Elgharib et al. |
| 2020/0137420 | A1* | 4/2020 | Natanzon ............ G06K 9/6289 |
| 2020/0305806 | A1* | 10/2020 | Tang .................... A61B 6/5205 |
| 2020/0356809 | A1* | 11/2020 | Ghosh ................... G06N 3/084 |
| 2020/0410688 | A1* | 12/2020 | Lv ........................... G06T 7/75 |

FOREIGN PATENT DOCUMENTS

| | | | |
|---|---|---|---|
| CN | 112017252 | A * | 12/2020 |
| CN | 112183166 | A * | 1/2021 |
| WO | 2019110124 | | 6/2019 |

OTHER PUBLICATIONS

Gowda, Shreyank et al., Color Net: Investigating the Importance of Color Spaces for Image Classification, arXiv; 1902.00267v1 [cs.CV] Feb. 1, 2019, 17 pages.

Gueguen, Lionel, Faster Neural Networks Straight from JPEG, 32nd Conference on Neural Information Processing Systems (NeurIPS 2018), Montreal, Canada, 12 pages.

Ulicny, Matej; et al. On Using CNN with DCT based Image Data Journal. 8 pages. Aug. 30-Sep. 1, 2017. Maynooth, Ireland. ISBN 978-0-9934207-0-6.

Jiang, Jianmin; et al. The Spatial Relationship of DCT Coefficients Between a Block and Its Sub-Blocks. Journal. 10 pages. IEEE Transactions on Signal Processing, vol. 50, No. 5, May 2002.

Wang, Yunhe; et al. CNNpack: Packing Convolutinal Neural Networks in the Frequency Domain. Journal. 9 pages. 30th Conference on Neural Information Processing Systems (NIPS 2016), Barcelona, Spain.

Tan, Kelvin Sim Zhen; et al. Classification of Compressed Domain Images Utilizing Open VINO Interference Engine. Journal. 10 pages. International Journal of Engineering and Advanced Technology (IJEAT) ISSN: 2249-8958, vol. 9, Issue—1, Oct. 2019.

Storkey, Amos; et al. Cosine Transform Priors for Enhanced Decoding of Compressed Images.Journal. 6 pages. School of Informatics, University of Edinburgh. 5 Forrest Hill, Edinburgh, EH1 2QL.

Verma, Vinay; et al. DCT-domain Deep Convolutional Neural Networks for Multiple JPEG Compression Classification. Journal. 12 pages. Multimedia Analysis and Security (MANAS) Lab, Electrical Engineering, Indian Institute of Technology Gandhinagar (IITGN), Gujarat, India. arXiv:1712.02313v1 [cs.MM] Dec. 6, 2017.

Ehrlich Max; et al. Deep Residual Learning in the JPEG Transform Domain; Journal. 10 pages. University of Maryland, College Park, MD, USA.

Bodnar, Peter; et al. Localization of Visual Codes In the DCT Domain Using Deep Rectifier Neural Networks. Journal; 8 pages. University of Szeged, Department of Image Processing and Computer Graphics, Szeged,Hungary. ISBN: 978-989-758-041-3 Copyright 2014 SCITEPRESS(ScienceandTechnologyPublications, Lda.).

* cited by examiner

USING SELECTED COMPONENTS OF FREQUENCY DOMAIN IMAGE DATA IN ARTIFICIAL INTELLIGENCE TASKS

RELATED U.S. APPLICATIONS

This application is related to, and incorporates by reference in their entirety, the following pending U.S. patent applications: U.S. Appl. No. 16/684,363, filed Nov. 14, 2019, "Techniques for Determining Importance of Encoded Image Components for Artificial Intelligence Tasks," by Xu et al.; U.S. Appl. No. 16/684,412, filed Nov. 14, 2019, "Techniques to Dynamically Gate Encoded Image Components for Artificial Intelligence Tasks," by Xu et al.; and U.S. Appl. No. 16/684,294, filed Nov. 14, 2019, "Reconstructing Transformed Domain Information in Encoded Video Streams," by Qin et al.

BACKGROUND

When digital image frames are encoded (compressed), the frames of data are decomposed into macroblocks, each of which contains an array of blocks. Each of the blocks contains an array of pixels in the spatial (e.g., red (R), green (G), and blue (B)) domain. The pixels in the RGB domain can be converted into data in the luma-chroma color space, which includes a luma color component (Y), a blue-difference chroma color component (Cb), and a red-difference chroma color component (Cr). A discrete cosine transform (DCT) is performed to convert each block of YCbCr data into the frequency domain (referred to as DCT coefficients). In quantization, the amount of frequency information is reduced so that fewer bits can be used to describe the image data. After quantization, the compression process concludes with entropy encoding (e.g., run-length encoding such as Huffman encoding) to encode and serialize the quantized data into a bit stream. The bit stream can be transmitted and/or stored, and subsequently decoded back into the spatial domain, where the image can be viewed or used in other applications such as machine learning. Conventionally, the decoding process is essentially the inverse of the encoding process, and includes entropy decoding of the bit stream into frames of data, dequantization of the frames, and inverse DCT transformation of the dequantized data.

Thus, in essence, image data is processed from the spatial (e.g., RGB) domain into the frequency (DCT) domain when it is encoded, then processed back from the frequency domain to the spatial domain when it is decoded.

For artificial intelligence applications, machine learning (including deep learning) tasks are performed in the spatial domain as mentioned above. This requires fully decoding videos back to the spatial (e.g., RGB) domain, which increases the latency and power consumption associated with reconstruction of videos in the spatial domain, and can also increase the latency and power consumption associated with deep neural network computing.

SUMMARY

In embodiments according to the present invention, image data is accessed. The image data includes frequency domain components (e.g., luma, blue-difference, and red-difference color components that have been transformed into a frequency domain (e.g., the discrete cosine transform, DCT, domain)). A subset of the frequency domain components is selected based on the relative importance of the frequency domain components. Only the subset of the frequency domain components is provided to an accelerator that executes a neural network to perform an artificial intelligence (AI) task (e.g., machine learning or deep learning) using the subset of frequency domain components.

Consequently, AI tasks can be performed without decoding images from the frequency domain into the spatial (e.g., red-green-blue) domain. This is particularly useful in deep learning tasks where frame reconstruction in the spatial domain is not needed, such as image classification and facial recognition. Performing deep learning tasks in the frequency (e.g., DCT) domain reduces the latency and power consumption associated with reconstruction of images in the spatial domain, and can also reduce the latency and power consumption associated with deep neural network computing.

Also, because only selected frequency domain components are used in the AI tasks, computation speed and data transfer rates can increase, and the impact on available bandwidth is reduced. The subset of frequency domain components can be employed in the encoding process or in the decoding process, allowing these processes to be completed more quickly while reducing the power consumption associated with these processes and the impact on bandwidth of providing the outputs of these processes to the accelerator. The amount of traffic to the accelerator can be reduced by a factor of 20. Embodiments according to the invention are compatible with and can be utilized with conventional processes and systems (e.g., as add-ons).

These and other objects and advantages of the various embodiments of the present invention will be recognized by those of ordinary skill in the art after reading the following detailed description of the embodiments that are illustrated in the various drawing figures.

BRIEF DESCRIPTION OF DRAWINGS

The accompanying drawings, which are incorporated in and form a part of this specification and in which like numerals depict like elements, illustrate embodiments of the present disclosure and, together with the detailed description, serve to explain the principles of the disclosure.

DETAILED DESCRIPTION

Figure 1:
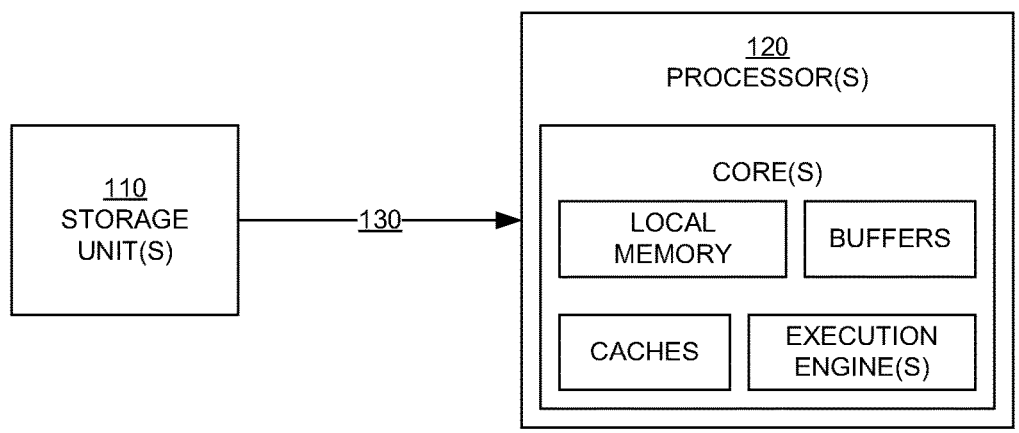
FIG. 1 is a block diagram illustrating an example of a computer system upon which embodiments according to the present invention can be implemented.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "receiving," "accessing," "determining," "using," "training," "encoding," "decoding," "quantizing," "dequantizing," "(discrete cosine) transforming," "(inverse discrete cosine) transforming," "adding," "duplicating," "copying," "storing," "selecting," "providing," "executing," or the like, refer to actions and processes (e.g., the process 200 and flowcharts 300 and 800 of FIGS. 2, 3, and 8, respectively) of an apparatus or computer system or similar electronic computing device or processor (e.g., the system 100 of FIG. 1). A computer system or similar electronic computing device manipulates and transforms data represented as physical (electronic) quantities within memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory (e.g., an SSD) or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

FIG. 1 is a block diagram illustrating an example system 100 upon which embodiments according to the present invention can be implemented. In general, the system 100 is a type of device that can be used with or in a system or processor that processes (e.g., encodes and/or decodes) graphical data, which includes image data.

In the example of FIG. 1, the system 100 can include one or more storage units (computer storage media) 110 and a processor 120 communicatively coupled by a communication interface 130. The processor 120 can include one or more cores, and each core may include local memory that may be distributed among the cores, one or more buffers and/or caches, and one or more execution engines. The term "memory" may be used herein to refer to the buffers and/or caches and/or local memory. The communication interface 130 can include a wired network communication link, a wireless network communication link, a data bus, or the like. The processor 120 may be referred to as a configurable processing element. In an embodiment, the processor 120 is a neural processing unit (NPU).

Figure 2:
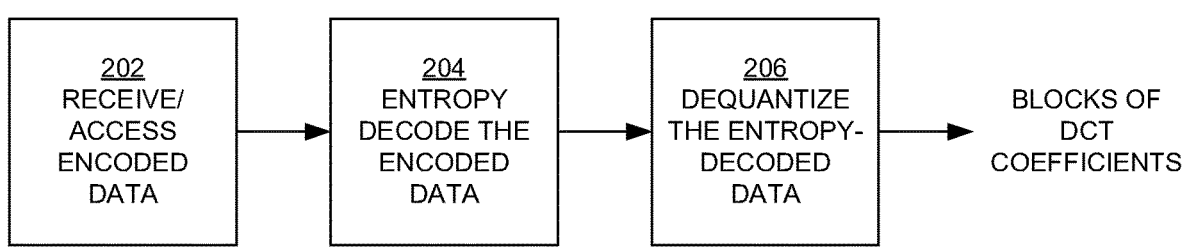
FIG. 2 illustrates a process for decoding (decompressing) an encoded (compressed) image in embodiments according to the present invention.

FIG. 2 illustrates the process 200 for decoding (decompressing) an encoded (compressed) image in embodiments according to the present invention.

In block 202 of FIG. 2, encoded image data is received from another device or accessed from computer system memory, for example. The image data includes frequency domain components (e.g., luma, blue-difference, and red-difference (YCrCb) color components that have been transformed into a frequency domain (e.g., the discrete cosine transform, DCT, domain)).

In block 204, the encoded data is entropy decoded. In block 206, the entropy-decoded data is dequantized. The dequantized data consists of frequency domain components: a frame of data in the frequency domain (e.g., a frame that includes blocks of DCT coefficients). Significantly, and advantageously, in embodiments according to the present invention, the inverse DCT operation is not performed.

Using Selected Frequency Domain Components in Artificial Intelligence Tasks

In overview, in embodiments according to the present invention, a subset of the components (e.g., luma (Y), blue-difference (Cb), and red-difference (Cr) color components) in the frequency (e.g., DCT) domain is selected based on a relative importance of the components in the frequency domain. For example, the relative importance of each DCT component is determined, where each DCT component corresponds to multiple spatial domain pixels (color components). The components in the frequency domain may also be referred to herein as "components of frequency domain image data" or "frequency domain components" or "frequency domain components of image data." Only the subset of the frequency domain components is provided to an accelerator that executes a first neural network to perform a machine learning task using the subset of frequency domain components. As used herein, the use of the term "artificial intelligence" (AI) is intended to include machine learning, deep learning, and the like.

Generally speaking, the term "accelerator" is used herein to refer to a type of processor or device that is designed to accelerate the performance of AI tasks. An accelerator can be implemented as, for example (but not limited to), a graphics processing unit, a field-programmable gate array, an application-specific integrated circuit, or an NPU. An accelerator as used herein may also be referred to as an AI accelerator, a machine learning accelerator, or an accelerator processor.

Figure 3:
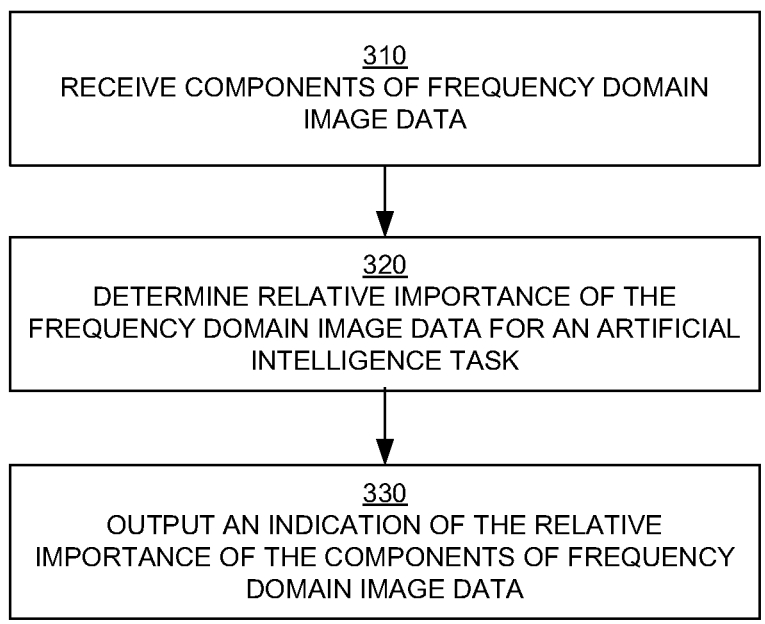
FIG. 3 is a flowchart of a method of determining the relative importance of frequency domain components in an embodiment according to the present invention.

FIG. 3 is a flowchart 300 of a method of determining the relative importance of frequency domain (e.g., DCT) components in an embodiment according to the present invention. All or some of the operations represented by the blocks in the flowchart 300 can be implemented as computer-executable instructions residing on some form of non-transitory computer-readable storage medium, and performed by a computer system such as the system 100 of FIG. 1.

In block 310 of FIG. 3, components of frequency domain image data are accessed (e.g., from memory) or received (e.g., from an image capture device or camera). In an embodiment, the frequency domain components include color (YCbCr) components in the DCT domain. However, the present invention is not so limited. For example, the frequency domain components can be components of Fourier Transform image data, components of Wavelet Transform image data, components of Discrete Wavelet Transform image data, components of Hadamard transform image data, or components of Walsh transform image data.

In block 320, the relative importance of the frequency domain components for AI tasks can be determined. In an embodiment, to determine the relative importance of the frequency domain components, the components are gated to turn on selected ones of the components for input to a deep neural network (DNN) during training of the DNN.

In another embodiment, to determine the relative importance of the frequency domain components, the components are gated based on a cost function to control selected ones of the components of the frequency domain image data for input to a DNN during training of the DNN. For example, the cost function can include a first term based on an error between a prediction and a target value, and a second term based on the number of active channels in accordance with the following equation:

Cost=Loss(prediction,target)+λ#Proportion(active_channels).

In yet another embodiment, to determine the relative importance of the frequency domain components, the components are gated so that more important components are more likely to be turned on than less important components for input to a DNN during training of the DNN.

In block 330, an indication of the relative importance of the frequency domain components can be output. In an embodiment, that indication is provided to an accelerator for use in performing an AI task (e.g., using the DNN for inference/prediction) using the components of the frequency domain image data.

Figure 4:
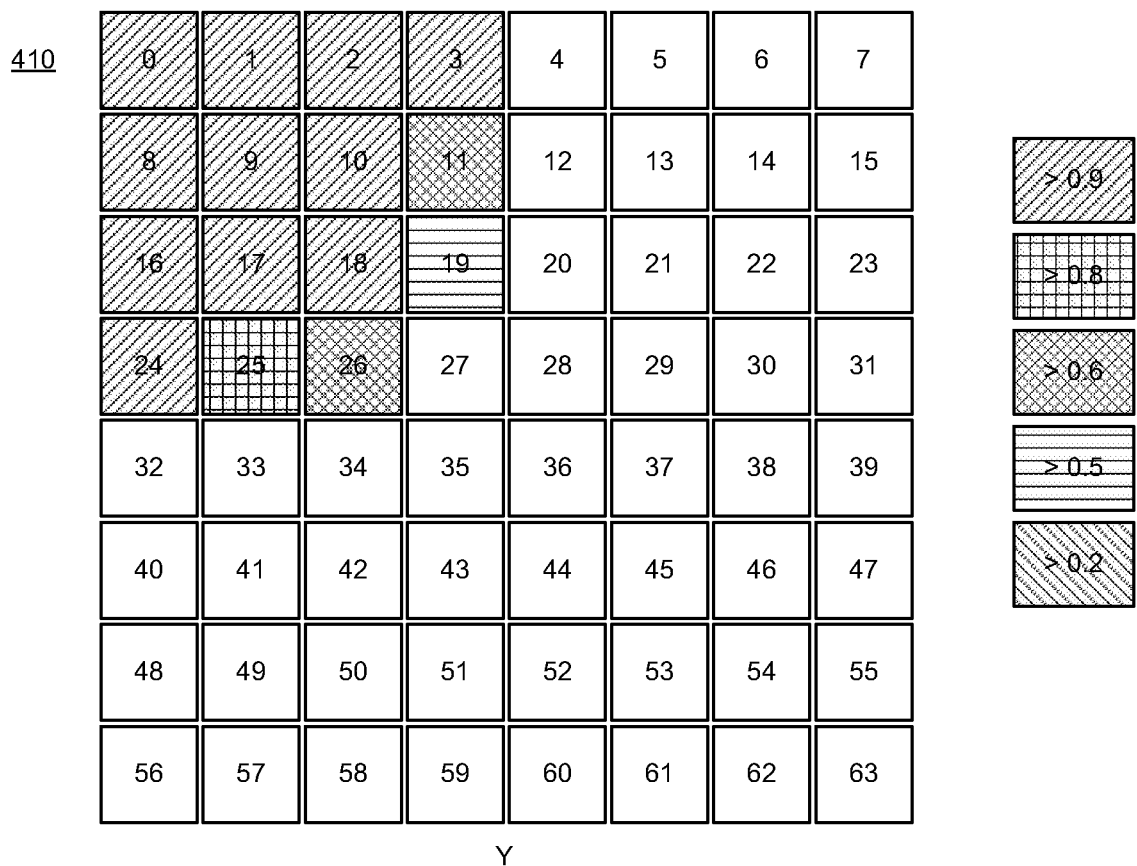
FIG. 4 illustrates an example of the relative importance of frequency domain components in an embodiment according to the present invention.
Figure 4:
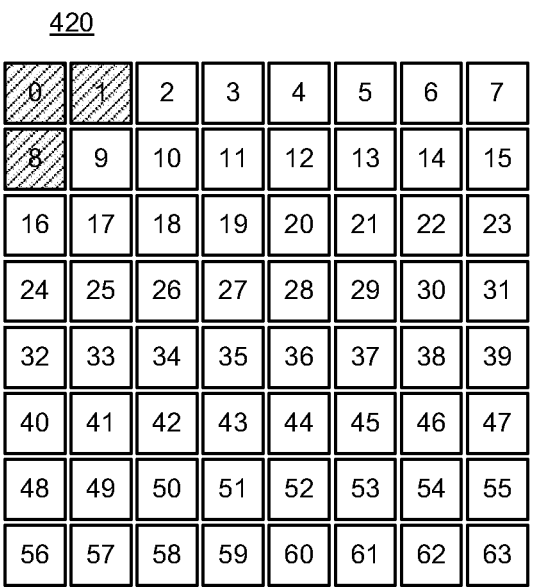
Figure 4:
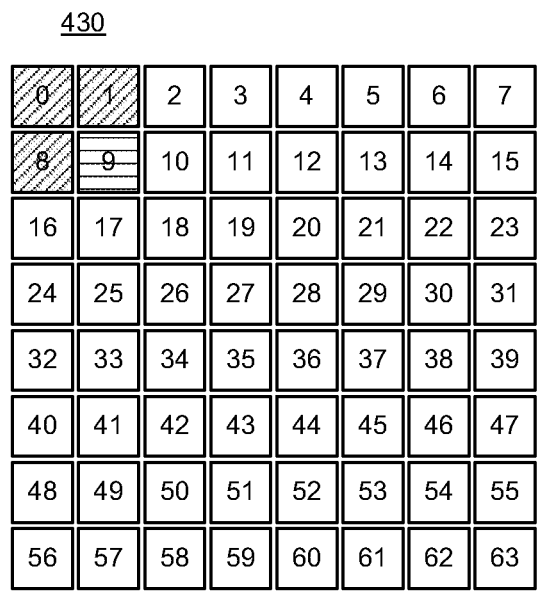

FIG. 4 illustrates an example of the relative importance of frequency domain components determined using the methodology of FIG. 3, in an embodiment according to the present invention. The active channels in the example of FIG. 4 are mostly on the luma (Y) channels 410 (15 channels), and to a lesser extent on blue-difference chroma (Cb) channels 420 (three channels), and red-difference chroma (Cr) channels 430 (four channels), for a total of 22 channels. In this example, using the ImageNet dataset processed using a MobileNet_v2 architecture for 192 channels (64 Y channels, 64 Cb channels, and 64 Cr channels), the accuracy is approximately 70%. In comparison, using 22 channels as in the example of FIG. 4, an accuracy of approximately 69.3% is achieved. Accordingly, in this example, substantially the same accuracy can be achieved while reducing the number of processed channels by 170 (more than 88 percent of the channels).

Thus, by determining the relatively important channels (the subset of the relatively important frequency domain components), the amount of information that is input to and used by an accelerator can be reduced, as will be discussed further below. This can advantageously reduce computational workload, data transmission bandwidth, processing latency, and power consumption without significantly impacting accuracy.

Figure 5:
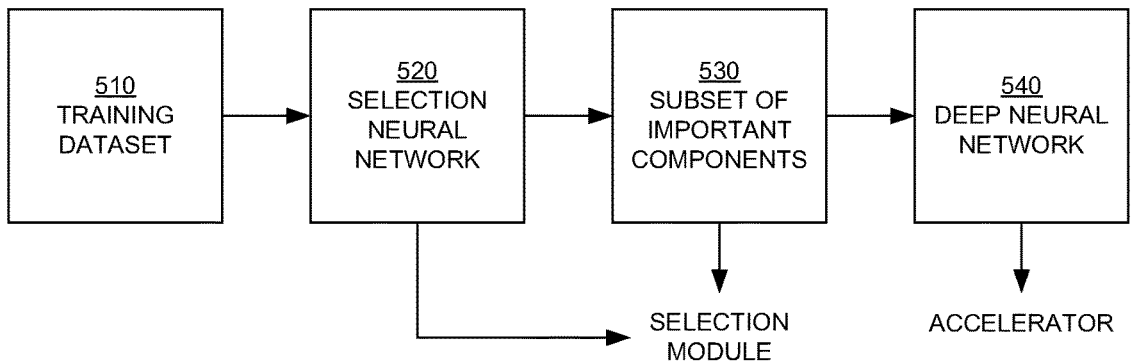
FIG. 5 is a block diagram illustrating a process for training a deep neural network that can be executed in an accelerator in an embodiment according to the present invention.

FIG. 5 is a block diagram illustrating a process or training module 500 for training a deep neural network 540 that can be executed in an accelerator in an embodiment according to the present invention. A training dataset 510 of images in the frequency (e.g., DCT) domain is accessed by the selection neural network 520. The selection neural network 520 is trained by performing the functions described above in conjunction with FIGS. 3 and 4, to determine a subset 530 of relatively important frequency domain components (e.g., YCrCb components in the frequency domain) as described above (see the discussion of FIGS. 3 and 4 above). The selected subset 530 of frequency domain components is then used to train the DNN 540 that will be executed using an accelerator. Therefore, both the selection neural network 520 and the DNN 540 are trained in the frequency (e.g., DCT) domain.

The selected subset 530 of relatively important frequency domain components can be utilized in a selection module, and as noted the DNN 540 can then be deployed in an accelerator (see the discussion of FIGS. 6 and 7 below). Thus, the selection neural network 520 and the DNN 540 can be trained together but separately deployed.

The DNN 540 may be referred to herein as the first neural network, and the selection neural network 520 may be referred to herein as the second neural network (where "first" and "second" are used only as identifiers and do not necessarily imply an order or ranking).

The selection neural network 520 can determine a fixed (static) selection policy for the selection module, or the selection neural network can execute at, for example, run time to determine a dynamic selection policy for the selection module.

The process 500 of FIG. 5 can be performed using different training datasets to develop and train deep neural networks that are suited for different AI (e.g., machine learning or deep learning) tasks. For example, if the AI task is image classification, then perhaps the dataset 510 is a more comprehensive image dataset that can be used to develop and train a DNN suited for that task. However, if the AI task is facial recognition, then perhaps the perhaps the dataset 510 is a less comprehensive image dataset that can be used to develop and train a DNN for that task—for example, a dataset that consists of images of human faces. As a result, the selected subset 530 of relatively important frequency domain components may depend on the AI task and/or the DNN being executed by the accelerator. In other words, a number of different subsets of relatively important frequency domain components can be determined as a function of the type of AI task or the type of DNN. Thus, when a particular type of AI task is to be performed, or a particular type of DNN is to be executed, then the appropriate subset of relatively important frequency domain components can be selected accordingly. In other words, in an embodiment, a subset 530 of the relatively important frequency domain components is selected according to the AI task to be executed by the neural network 540, and/or is selected according to the type of neural network 540.

Figure 6:
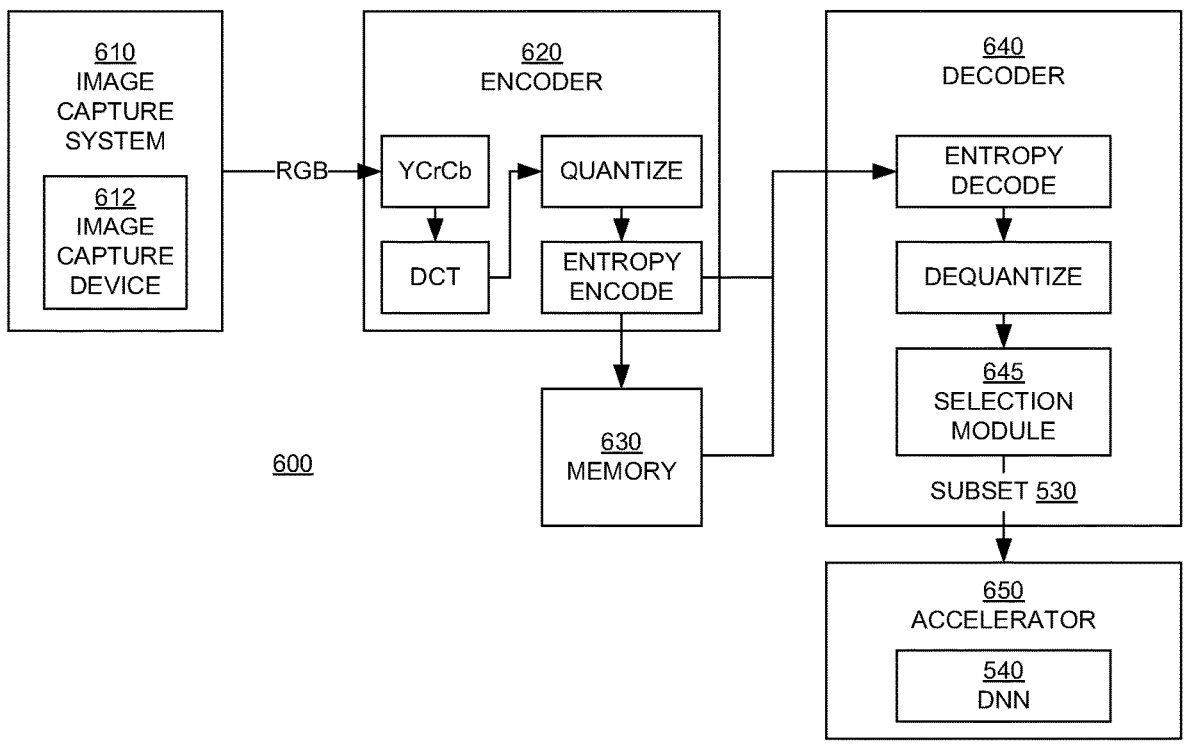
FIG. 6 is a block diagram illustrating a system that uses selected frequency domain components in artificial intelligence tasks in an embodiment according to the present invention.

FIG. 6 is a block diagram illustrating a system 600 that uses selected frequency domain components in AI tasks in an embodiment according to the present invention. In the example of FIG. 6, the system includes an image capture system 610, an encoder 620, memory 630, a decoder 640, and an accelerator 650. Those elements can be implemented on a single computer system (e.g., the system 100 of FIG. 1), or those elements can be implemented—in any combination or grouping—on more than one such computer system. Also, a system on which embodiments according to the present invention can be implemented may include other elements in addition to those just listed or described below, or it may not include all of the listed or described elements. The encoder 620 and the decoder 640 may be referred to herein as an image processing element or as an image processor. In an embodiment, the encoder 620 and the decoder 640 are each implemented using the processor 120 of FIG. 1.

In an embodiment, the image capture system 610 of FIG. 6 includes an image capture device 612 (e.g., a camera). Image data in the red-green-blue (RGB) spatial domain is captured by the image capture device 612 and provided to the encoder 620. That image data can also be provided to the memory 630 so that it can be subsequently accessed by the encoder.

Using the encoder 620, the data in the RGB domain is converted into data in the YCrCb color space. A frequency domain transform (e.g., DCT) is performed to convert the YCbCr data into the frequency domain. The frequency domain data is quantized and then entropy encoded. The resulting encoded image data can be transmitted to the decoder 640 and/or stored in the memory 630 so that it can be subsequently accessed by the decoder.

The decoder 640 receives the encoded image data from the encoder 620 or accesses that data from the memory 630, and entropy decodes the data and then dequantizes the entropy-decoded data, to produce frequency domain components (YCrCb image data in the frequency domain).

In an embodiment according to the present invention, the decoder 640 includes, or is communicatively coupled to, a selection module or selector 645. The selection module 645 selects only the subset 530 of relatively important frequency domain components (see the discussion of FIGS. 3-5 above) from the YCrCb image data in the frequency domain, and transmits only these frequency domain components to the accelerator 650. The accelerator 650 can then execute an AI task or tasks using the DNN 540 that was trained on the subset 530 of relatively important frequency domain components as discussed above.

As noted above, the subset 530 of relatively important frequency domain components can depend on the type of DNN 540 to be executed by the accelerator 650 and/or on the type of AI task to be performed by the accelerator and different subsets of relatively important frequency domain components can be determined accordingly. Therefore, in an embodiment, the selection module 645 can select a subset of relatively important frequency domain components according to the type of AI task and/or the type of DNN.

Figure 7:
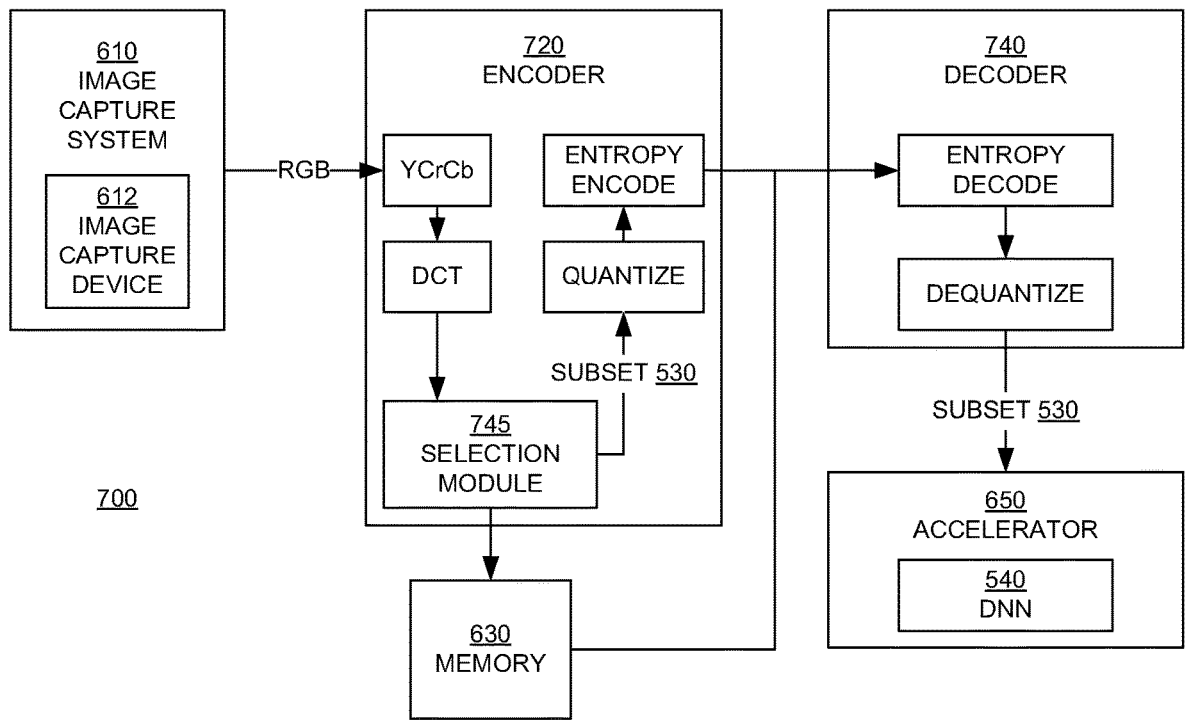
FIG. 7 is a block diagram illustrating a system that uses selected frequency domain components in artificial intelligence tasks in an embodiment according to the present invention.

FIG. 7 is a block diagram illustrating a system 700 that uses selected frequency domain components in AI tasks in an embodiment according to the present invention. In the example of FIG. 7, the system includes the image capture system 610, an encoder 720, the memory 630, a decoder 740, and the accelerator 650. Those elements can be implemented on a single computer system (e.g., the system 100 of FIG. 1), or those elements can be implemented—in any combination or grouping—on more than one such computer system. Also, a system on which embodiments according to the present invention can be implemented may include other elements in addition to those just listed or described below, or it may not include all of the listed or described elements. The encoder 720 and the decoder 740 may be referred to herein as an image processing element or as an image processor. In an embodiment, the encoder 720 and the decoder 740 are each implemented using the processor 120 of FIG. 1.

In the embodiment of FIG. 7, using the encoder 720, the data in the RGB domain is converted into data in the YCrCb color space. A frequency domain transform (e.g., DCT) is performed to convert the YCbCr data into the frequency domain. In this embodiment, the encoder 720 includes, or is communicatively coupled to, a selection module or selector 745. Before the frequency domain data is quantized and entropy encoded, the selection module 745 selects only the subset 530 of relatively important frequency domain components (see the discussion of FIGS. 3-5 above) from the YCrCb image data. Then, only the selected subset 530 of relatively important frequency domain components is quantized, entropy encoded, and provided to the decoder 740 and/or the memory 630.

The decoder 740 receives the encoded image data (only the subset 530 of relatively important frequency domain components) from the encoder 620 or accesses that data from the memory 630, and entropy decodes and dequantizes that subset, to produce frequency domain components (YCrCb image data in the frequency domain) only for the frequency domain components in the selected subset 530. Only those frequency domain components are provided to the accelerator 650. The accelerator 650 can then execute an AI task or tasks using the DNN 540 that was trained on the subset 530 of relatively important frequency domain components as discussed above.

In the embodiment of FIG. 7, the selection module 745 can employ either a fixed (static) selection policy determined by the selection neural network 520 (FIG. 5), or it can employ a dynamic selection policy by executing the selection neural network (e.g., in a configurable processing element) at run time to select the relatively important frequency domain components based on, for example, the image captured by the image capture system 610.

As noted above, the subset 530 of relatively important frequency domain components can depend on the type of DNN 540 to be executed by the accelerator 650 and/or on the type of AI task to be performed by the accelerator, and different subsets of relatively important frequency domain components can be determined accordingly. Therefore, in an embodiment, the selection module 745 can also select a subset of relatively important frequency domain components according to the type of AI task and/or the type of DNN.

Thus, in embodiments according to the present invention, only the relatively important frequency domain components (YCrCb color components in the frequency (e.g., DCT) domain) are provided to the accelerator 650 and the DNN 540.

Thus, AI tasks can be performed without decoding images from the frequency domain into the spatial (e.g., RGB) domain. This is particularly useful in deep learning tasks where frame reconstruction in the spatial domain is not needed, such as image classification and facial recognition. Performing deep learning tasks in the frequency (e.g., DCT) domain reduces the latency and power consumption associated with reconstruction of images in the spatial domain, and can also reduce the latency and power consumption associated with deep neural network computing.

Also, because only selected frequency domain components are used in the AI tasks, computation speed and data transfer rates can increase, and the impact on available bandwidth is reduced. The subset of frequency domain components can be employed in the encoding process or in the decoding process, allowing these processes to be completed more quickly while reducing the power consumption associated with these processes and the impact on bandwidth of providing the outputs of these processes to the accelerator. The amount of traffic to the accelerator can be reduced by a factor of 20.

Figure 8:
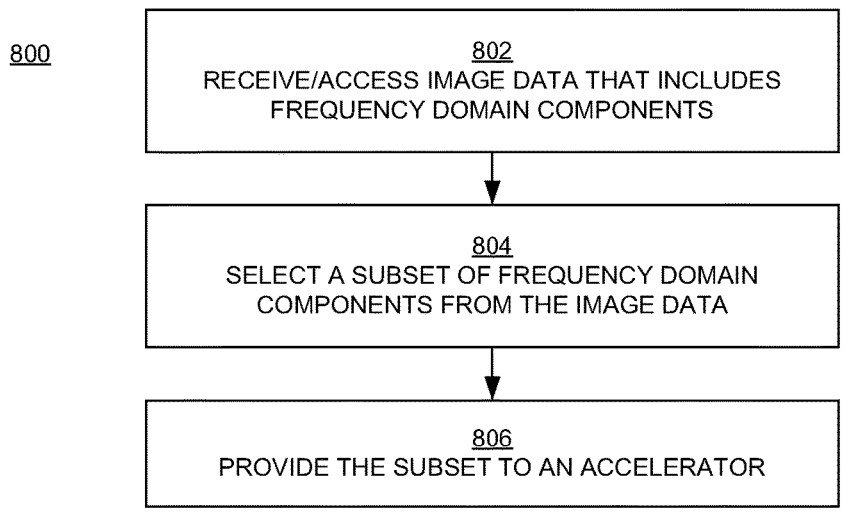
FIG. 8 is a flowchart of a method of using selected frequency domain components in artificial intelligence tasks in an embodiment according to the present invention.

FIG. 8 is a flowchart 800 of a method of using selected frequency domain components in artificial intelligence tasks in an embodiment according to the present invention. All or some of the operations represented by the blocks in the flowchart 800 can be implemented as computer-executable instructions residing on some form of non-transitory computer-readable storage medium, and performed by a computer system such as the computer system 100 of FIG. 1.

In block 802 of FIG. 8, image data for an image is received or accessed. The image data includes frequency domain components (color (YCrCb) components transformed into a frequency domain).

In block 804, a subset 530 of the frequency domain components is selected from the image data based on a relative importance of the frequency domain components, as described above in conjunction with FIGS. 3-7.

In the embodiment of FIG. 6, the image data is in the frequency domain and is dequantized prior to selecting the subset of frequency domain components. That is, the selection module 645 is in or is implemented by the decoder 640, and the selection module is downstream of the dequantizer stage.

In the embodiment of FIG. 7, the image data is in the frequency domain but is quantized subsequent to selecting the subset of frequency domain components. That is, the selection module 745 is in or is implemented by the encoder 720, and the selection module is downstream of the frequency domain transformation stage and upstream of the quantization stage.

In block 806 of FIG. 8, only the subset 530 of the frequency domain components is provided to an accelerator 650 that executes a neural network 540 to perform an AI task using the subset of frequency domain components, as described above in conjunction with FIGS. 6 and 7.

Figure 9:
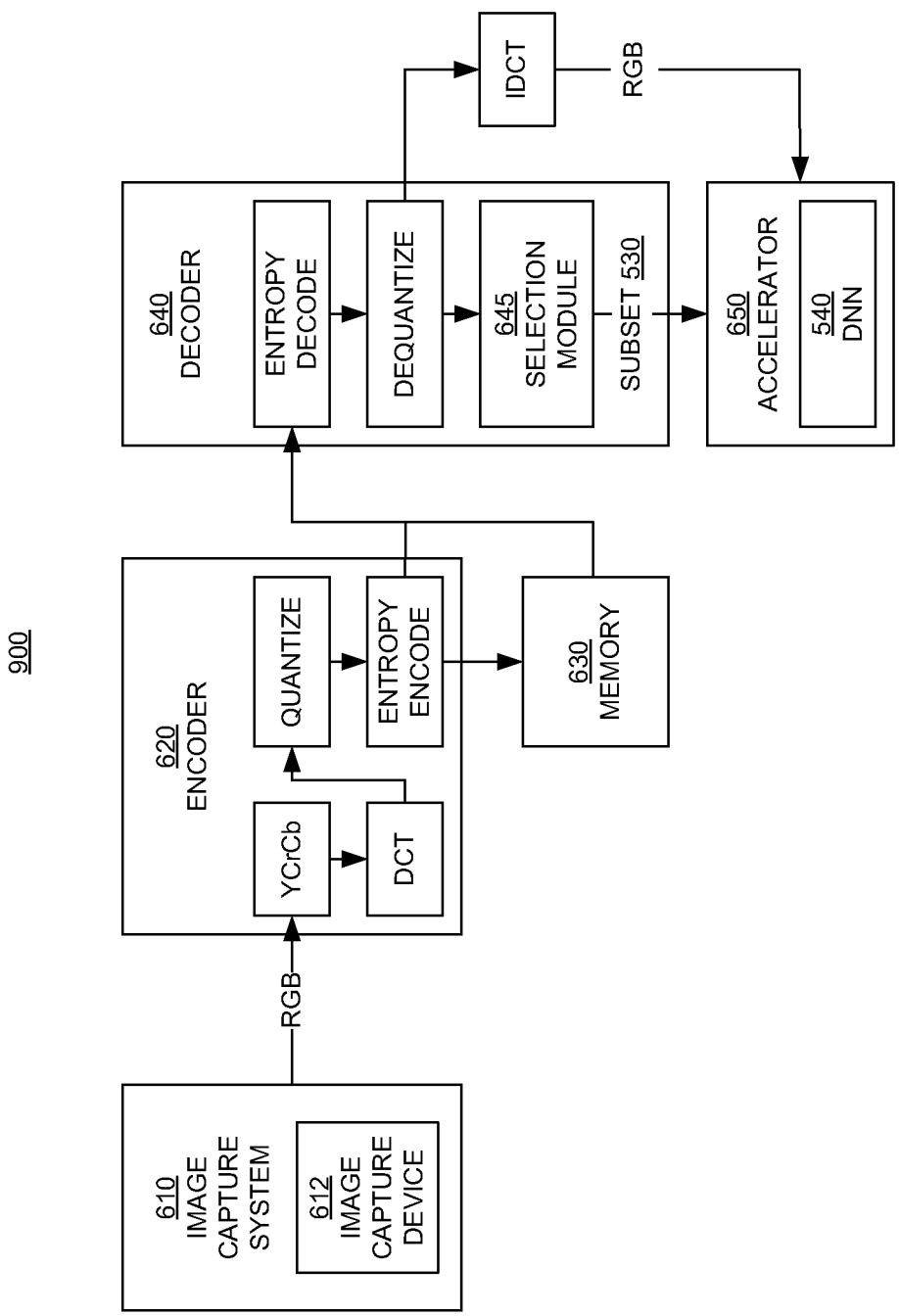
FIGS. 9 and 10 are block diagrams illustrating systems that use selected frequency domain components in combination with spatial domain components in artificial intelligence tasks in embodiments according to the present invention.
Figure 10:
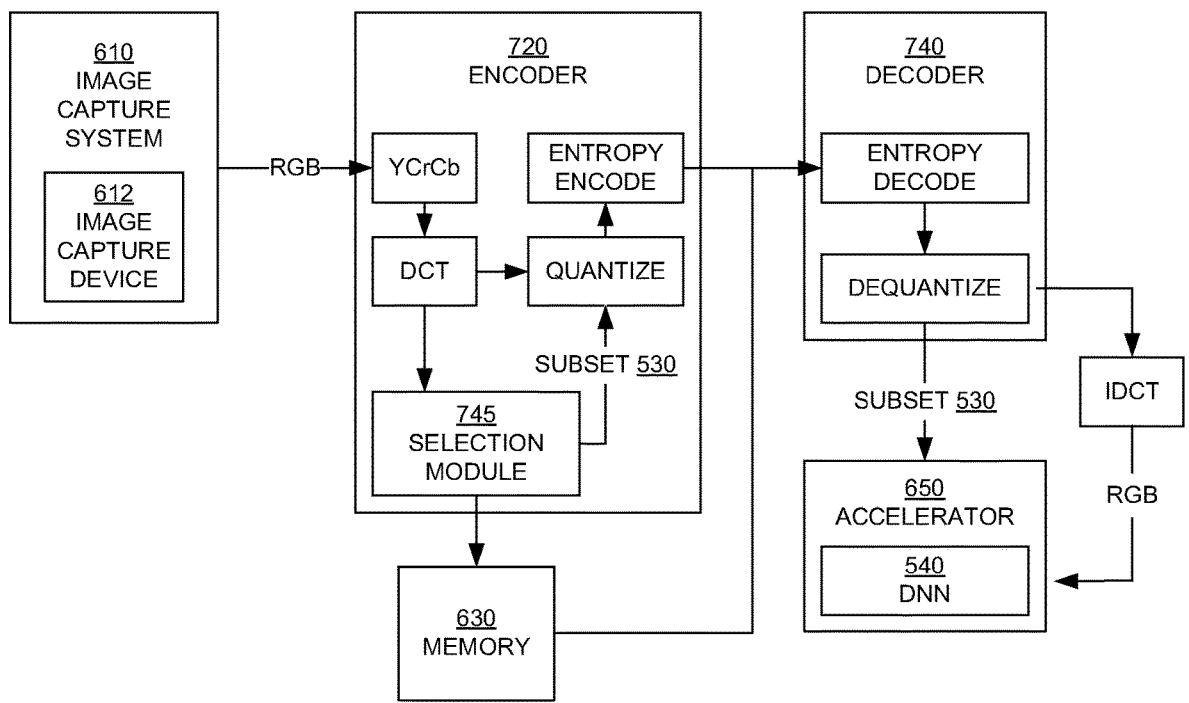

Embodiments according to the invention are compatible with and can be utilized with conventional processes and systems (e.g., as add-ons). FIGS. 9 and 10 are block diagrams illustrating systems 900 and 1000, respectively, that use selected frequency domain components in combination with spatial domain components in artificial intelligence tasks in embodiments according to the present invention.

With reference first to FIG. 9, relative to the system 600 of FIG. 6 and in addition to the operations already described in the above discussion of the system 600, after entropy decoding and dequantization are performed in the decoder 640, the frequency domain components can bypass the selection module 645 and can then be transformed into the spatial (e.g., RGB) domain by performing an inverse DCT (IDCT) operation. The data in the spatial domain can then be provided to the accelerator 650. In this case, the accelerator 650 can also be trained in the spatial domain.

With reference to FIG. 10, relative to the system 700 of FIG. 7 and in addition to the operations already described in the above discussion of the system 700, after the frequency domain (DCT) transform is performed, the frequency domain components can bypass the selection module 745 and are quantized, entropy encoded, and provided to the decoder 740. Those frequency domain components can then be transformed into the spatial (e.g., RGB) domain by performing an IDCT operation, and the data in the spatial domain can then be provided to the accelerator 650. In this case, the accelerator 650 can also be trained in the spatial domain.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

Although the subject matter has been described in language specific to structural features and/or methodological acts, it is to be understood that the subject matter defined in the disclosure is not necessarily limited to the specific features or acts described above. Rather, the specific features and acts described above are disclosed as example forms of implementing the disclosure.

Embodiments according to the invention are thus described. While the present disclosure has been described in particular embodiments, it should be appreciated that the invention should not be construed as limited by such embodiments, but rather construed according to the following claims.

What is claimed is:

1. A method, comprising:
    accessing image data entropy decoded from spatial domain to frequency domain for an image, wherein the image data comprises a plurality of frequency domain components;
    selecting a subset of the plurality of frequency domain components in the frequency domain based on a relative importance of the frequency domain components in the plurality of frequency domain components, wherein the relative importance is determined according to an artificial intelligence task to be executed by a first neural network; and
    providing only the subset of the plurality of frequency domain components to an accelerator that executes the first neural network to perform the artificial intelligence task using the subset of the plurality of frequency domain components.

2. The method of claim 1, wherein the image data further comprises quantized data transformed in the frequency domain, and wherein the method further comprises dequantizing the image data prior to said selecting.

3. The method of claim 1, further comprising quantizing the image data subsequent to transforming the image data into the frequency domain and subsequent to said selecting.

4. The method of claim 1, wherein said selecting further comprises selecting the subset of the plurality of frequency domain components according to a type of neural network executed by the accelerator.

5. The method of claim 1, further comprising training a second neural network to determine the relative importance of the frequency domain components based on image data for a set of images in the frequency domain.

6. The method of claim 1, further comprising training the first neural network based on the subset of the plurality of frequency domain components.

7. The method of claim 1, wherein the frequency domain is the discrete cosine transform domain.

8. The method of claim 1, wherein the relative importance is based on a measure of accuracy achieved using the subset of the plurality of frequency domain components to process images.

9. A processor, comprising:
    an image processing element; and
    memory coupled to the image processing element;
    wherein the image processing element is configured to: access image data entropy decoded from spatial domain to frequency domain for an image, wherein the image data comprises a plurality of frequency domain components; select a subset of the plurality of frequency domain components in the frequency domain based on a relative importance of the frequency domain components in the plurality of frequency domain components, wherein the relative importance is determined according to an artificial intelligence task to be executed by a first neural network; and provide only the subset of the plurality of frequency domain components to an accelerator that executes the first neural network to perform the artificial intelligence task using the subset of the plurality of frequency domain components.

10. The processor of claim 9, wherein the image processing element comprises a decoder, wherein the image data further comprises quantized data transformed in the frequency domain, and wherein the image processing element is further configured to dequantize the image data prior to selecting the subset of the plurality of frequency domain components.

11. The processor of claim 9, wherein the image processing element comprises an encoder, wherein the image processing element is further configured to quantize the image data subsequent to transforming the image data into the frequency domain and subsequent to selecting the subset of the plurality of frequency domain components.

12. The processor of claim 9, wherein the subset of the plurality of frequency domain components is selected according to a type of neural network executed by the accelerator.

13. The processor of claim 9, wherein the image processing element is further configured to: perform an inverse frequency domain transformation on the image data comprising the plurality of frequency domain components to produce image data in the spatial domain; and provide the image data in the spatial domain to the accelerator.

14. A non-transitory computer-readable storage medium comprising computer-executable modules, the computer-executable modules comprising:
    an image processing module that accesses image data entropy decoded from spatial domain to frequency domain for an image, wherein the image data comprises a plurality of frequency domain components; and
    a selection module coupled to the image processing module that: i) selects a subset of the plurality of frequency domain components in the frequency domain based on a relative importance of the frequency domain components in the plurality of frequency domain components, wherein the relative importance is determined according to an artificial intelligence task to be executed by a first neural network, and that ii) provides only the subset of the plurality of frequency domain components to an accelerator that executes the first neural network to perform the artificial intelligence task using the subset of the plurality of frequency domain components.

15. The non-transitory computer-readable storage medium of claim 14, wherein the image processing module comprises a decoder, wherein the image data further comprises quantized data transformed in the frequency domain, and wherein the decoder dequantizes the image data before the image data is received by the selection module.

16. The non-transitory computer-readable storage medium of claim 14, wherein the image processing module comprises an encoder that receives image data that is in the spatial domain and transforms the image data that is in the spatial domain to the frequency domain before the image data is received by the selection module, and wherein the encoder quantizes only the subset of the plurality of frequency domain components selected by the selection module.

17. The non-transitory computer-readable storage medium of claim 14, wherein the subset of the plurality of frequency domain components is selected according to a type of neural network executed by the accelerator.

18. The non-transitory computer-readable storage medium of claim 14, wherein the computer-executable modules further comprise a training module that trains a second neural network to determine the relative importance of the frequency domain components based on image data for a set of images in the frequency domain and that also trains the first neural network based on the subset of the plurality of frequency domain components.

\* \* \* \* \*